(12) United States Patent
Mehl et al.

(10) Patent No.: US 7,121,739 B1
(45) Date of Patent: Oct. 17, 2006

(54) FIBER OPTIC CABLE WITH CONNECTOR

(76) Inventors: Ronii C. Mehl, 6011 Arrowhead Ct., Foresthill, CA (US) 95631; Jonathan R. Gee, 10583 Rock View Ct., Auburn, CA (US) 95602

( * ) Notice: Subject to any disclaimer, the term of this patent is extended or adjusted under 35 U.S.C. 154(b) by 0 days.

(21) Appl. No.: 10/946,848

(22) Filed: Sep. 21, 2004

(51) Int. Cl.
   *G02B 6/36* (2006.01)
(52) U.S. Cl. .............................. 385/88; 385/27; 385/70
(58) Field of Classification Search ................ 385/88, 385/70, 27, 129
   See application file for complete search history.

(56) References Cited

U.S. PATENT DOCUMENTS

| | | | |
|---|---|---|---|
| 4,109,994 A | | 8/1978 | Chown |
| 4,504,114 A | | 3/1985 | Arrington |
| 4,707,067 A | * | 11/1987 | Haberland et al. ............. 385/90 |
| 4,712,096 A | * | 12/1987 | Cholin et al. ................ 340/590 |
| 4,836,643 A | | 6/1989 | France |
| 4,844,580 A | * | 7/1989 | Lynch et al. .................. 385/35 |
| 4,854,663 A | * | 8/1989 | Borsuk et al. ................ 385/77 |
| 4,889,399 A | * | 12/1989 | Mariani et al. ............... 385/35 |
| 4,989,943 A | * | 2/1991 | Yoshinaga et al. ............ 385/33 |
| 5,134,470 A | | 7/1992 | Ravetti |
| 5,177,806 A | | 1/1993 | Abbott |
| 5,293,438 A | * | 3/1994 | Konno et al. ................. 385/35 |
| 5,778,124 A | * | 7/1998 | Nedstedt ...................... 385/79 |
| RE35,935 E | | 10/1998 | Cabato |
| 6,347,889 B1 | | 2/2002 | Cheng |
| 6,524,015 B1 | | 2/2003 | Cheng |
| 2003/0059155 A1 | | 3/2003 | Riza |

* cited by examiner

*Primary Examiner*—Ellen E. Kim
(74) *Attorney, Agent, or Firm*—Heisler & Associates (57) ABSTRACT

A fiber optic cable is provided with connectors at terminal ends thereof. The connectors are configured to join TOSLINK compatible components together so that the cable can transmit an optical signal therebetween. A fiber of fused silica glass is provided with a plastic cladding material. Ball lenses are located at each terminal end of the fiber to enhance a signal intensity while maintaining signal quality passing through the cable and between the components joined together by the cable.

34 Claims, 4 Drawing Sheets

FIBER OPTIC CABLE WITH CONNECTOR

FIELD OF THE INVENTION

The following invention relates to fiber optic cable for transmitting a signal between ends of the cable. More particularly, this invention relates to fiber optic cable which includes, in some embodiments, a ball lens or other fiber with enhancement at ends of the cable to enhance signal intensity and overall performance of signals transmission through the cable.

BACKGROUND OF THE INVENTION

Fiber optic cable has long been known for transmitting signals between ends of the cable, utilizing a signal encoded with light rather than the signal being encoded with an electric current within an electric conductor. For instance, in telecommunications fiber optic cable is often utilized to transmit large volumes of telecommunications data encoded within light passing through the fiber optic cable.

In one particular application for fiber optic cable, an audio or video signal drives an electrical to optical signal converter which generates light and passes it into a fiber optic cable for transmission of the audio or video (or both) signal through the fiber optic cable to a signal processing component at a second location. At the far end of the cable, a light detector is provided which is coupled to an optical to electrical converter so that the signal arrives at the second location.

One such fiber optic cable is referred to by the trademark "TOSLINK," which features specialized connectors at ends of the cable and at ends of components adapted to be attached to the connectors. A TOSLINK system includes a fiber optic cable usually made from a plastic fiber optic material that connects a DVD player or other component to a receiver or other component. The reason the TOSLINK is used is because it can carry up to five (or more) separate digital signals at once from the DVD player to the receiver. The receiver can separate the signals for delivery to separate speakers out from the receiver. If typical copper wire were utilized for a similar connection, five separate strands of copper wire would typically need to be routed from the DVD player to the receiver.

Other applications for TOSLINK fiber optic cable are being developed in the audio and video field, as well as in home theater applications, automotive applications and in gaming applications. In each of these applications, the TOSLINK fiber optic cable or related cable is located between two separate components. The originating component has an electrical to optical converter which creates the light signal, typically output from an LED. The signal then passes through the fiber optic cable to the second component where a detector is located. The detector receives the signal and appropriately processes the signal for further beneficial use.

A TOSLINK fiber optic cable has two similar connectors on each end. The fiber optic material is typically located within a jacket to protect the fiber optic material between the two connectors. The TOSLINK fiber is plastic normally and is either multi mode or gradient index. The size of the fiber is 1,000 micrometers core size. The cladding, which is also plastic with the TOSLINK fiber, has an outer diameter of 1,100 micrometers.

The fiber optic cable within the TOSLINK system has significant weaknesses. Specifically, the fiber optic cable typically utilized in TOSLINK systems exhibits a signal loss of 160 decibels per meter. Any long cable would lose unacceptable amounts of signal intensity. A second problem with existing TOSLINK fiber optic cable is that it produces "jitter" within the signal. The plastic fiber within the TOSLINK system is very sensitive and when jitter occurs the sound from the speakers which are driven by the signal passing through the fiber is not pure, but distorted. Jitter is believed to be caused by loss of peak amplitude within the digital signal and/or by the elongation of the signal as it travels through the fiber.

Accordingly, a need exists for a fiber optic cable which can work with components designed for a fiber optic signal transmission system, such as the TOSLINK system, but which exhibit less signal degradation so that a higher quality signal can be transmitted, facilitating longer runs of fiber and enhancing a quality of the signal received at the far end of the cable.

SUMMARY OF THE INVENTION

With this invention, a fiber optic cable is provided which is preferably compatible with TOSLINK configured components, such as audio components including a DVD player and a receiver, and which have exceptionally low signal loss. The fiber optic cable is preferably formed of glass so that less signal loss per meter occurs. The glass fiber is made with a smaller diameter, most preferably 300 to 400 micrometers diameter, facilitating a reasonable amount of bending thereof. Also, an amount of signal intensity input into the fiber is enhanced by locating ball lenses or other forms of fiber diameter enhancement at the ends of the fiber. The fiber is preferably clad with a plastic cladding, further facilitating bending of the fiber and maintaining a durability of the fiber passing between the terminal ends of the cable.

Connectors placed at the ends of the cable can be any connectors needed to allow the cable to be conveniently coupled to a signal source component and a signal receiving component. Most preferably where TOSLINK compatible components are utilized, a connector which fits with the TOSLINK components is provided surrounding ends of the fiber optic cable of this invention. Light entering the cable is initially amplified by the ball lens so that an intensity of the signal in the fiber is enhanced. The low signal loss associated with the glass fiber allows a long run between ends of the fiber without significant signal loss. When the signal reaches the second end of the cable it exits the second end with a relatively large amount of light output and associated signal presented for the detector within the signal receiving component. An intense and high fidelity signal is thus received by the receiving component, so that the quality of the signal passing there through is maximized.

OBJECTS OF THE INVENTION

Accordingly, a primary object of the present invention is to provide a fiber optic cable which is coupleable between a signal originating component and a signal receiving component and which has low signal loss characteristics and minimal signal distortion characteristics.

Another object of the present invention is to provide a fiber optic cable for use with TOSLINK compatible components which can carry a signal relatively long distances without noticeable signal degradation.

Another object of the present invention is to provide a fiber optic cable which has a glass core with plastic cladding.

Another object of the present invention is to provide a fiber optic cable which includes ball lenses at each end of the fiber optic cable to maximize signal intensity transmitted through the fiber optic cable.

Other further objects of the present invention will become apparent from a careful reading of the included drawing figures, the claims and detailed description of the invention.

DESCRIPTION OF THE PREFERRED EMBODIMENT

Referring to the drawings, wherein like reference numerals represent like parts throughout the various drawing figures, reference numeral 10 (FIG. 3) is directed to a cable for transmitting an optical signal between two locations. The cable 10 is particularly configured with suitable fiber connectors 20 to join signal processing components 70 (FIG. 9) together and with an optical signal being transmitted between the separate signal processing components 70. In a preferred embodiment, the cable 10 connects components configured with connectors compatible with a TOSLINK interconnection standard, such as is commonly used to couple audio components together, such as audio receivers and sources of audio sound, such as DVD players.

Figure 1:
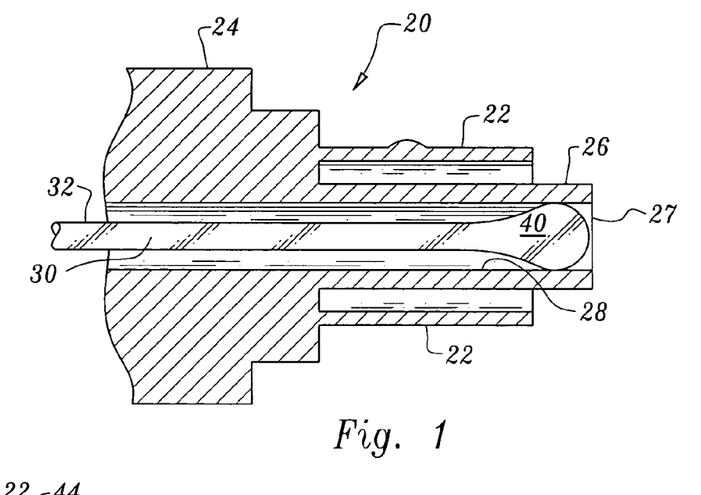
FIG. 1 is a full sectional view of a tip of a connector of a cable with a run of fiber passing there through and terminating at a ball lens according to this invention.
Figure 2:
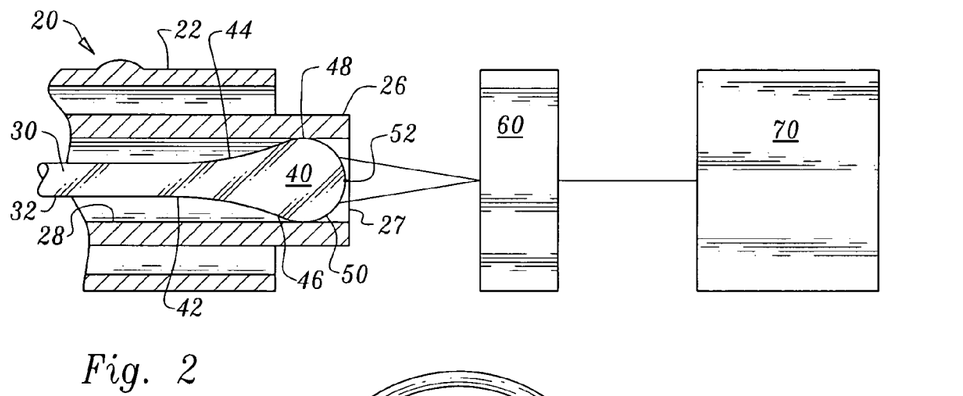
FIG. 2 is a schematic similar to that which is shown in FIG. 1, but additionally including adjacent components with which the cable interfaces.
Figure 3:
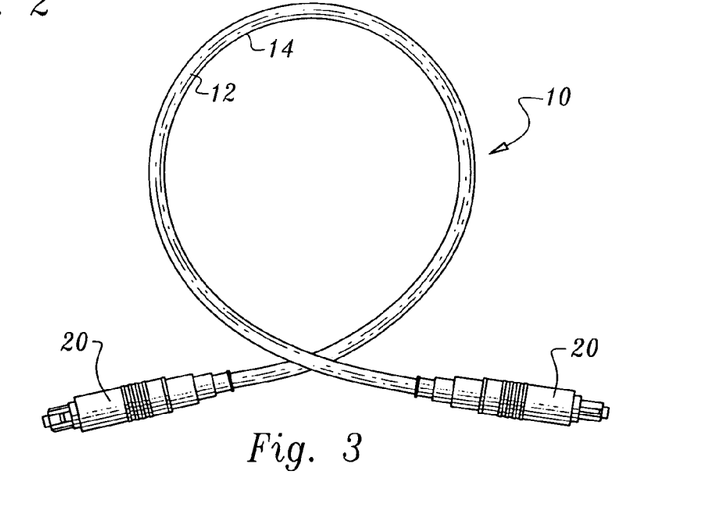
FIG. 3 is a top plan view of the cable of this invention showing the identical connectors at opposite ends of the cable.
Figure 4:
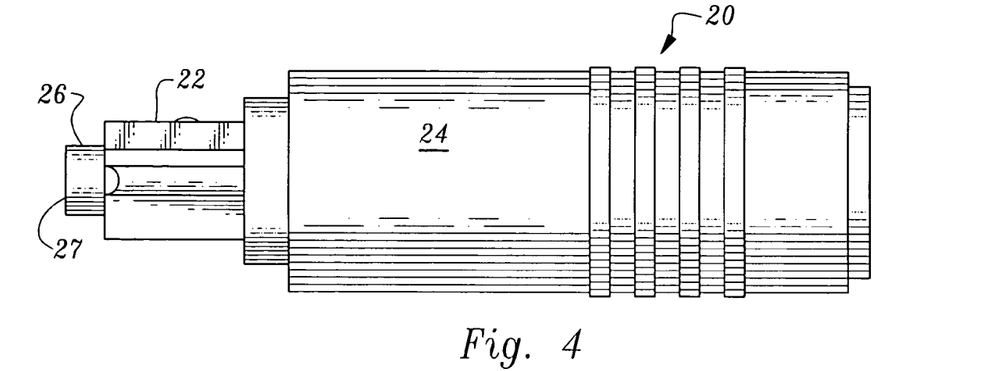
FIG. 4 is a front elevation view of the connector of this invention.
Figure 5:
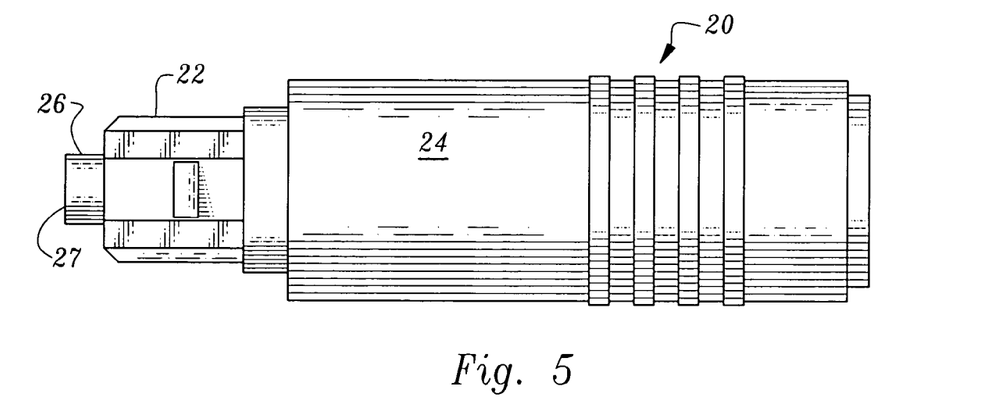
FIG. 5 is a top plan view of the connector of this invention.
Figure 6:
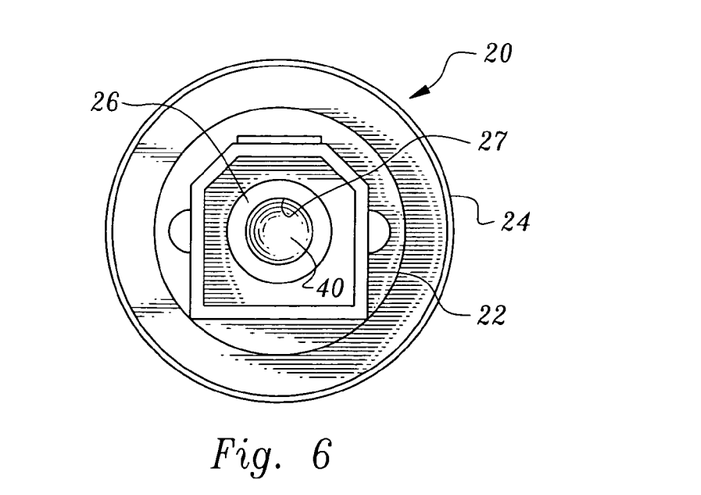
FIG. 6 is an end elevation view of the connector of this invention.
Figure 7:
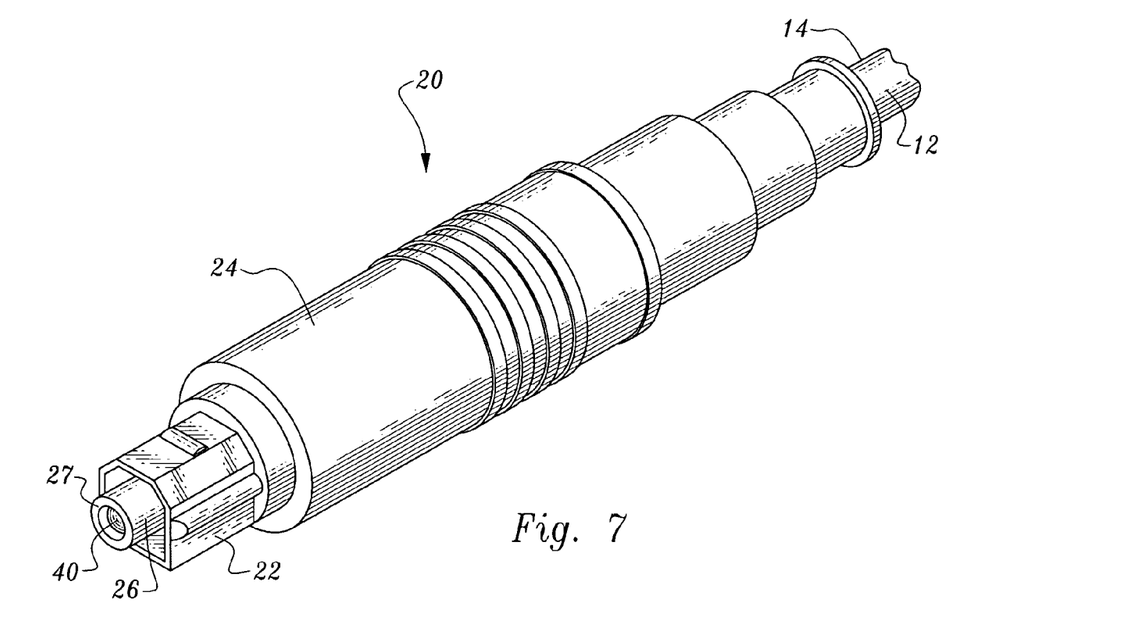
FIG. 7 is a perspective view of one end of the cable showing the connector thereon and showing where the ball lens of the fiber is exposed at the end of the connector.
Figure 8:
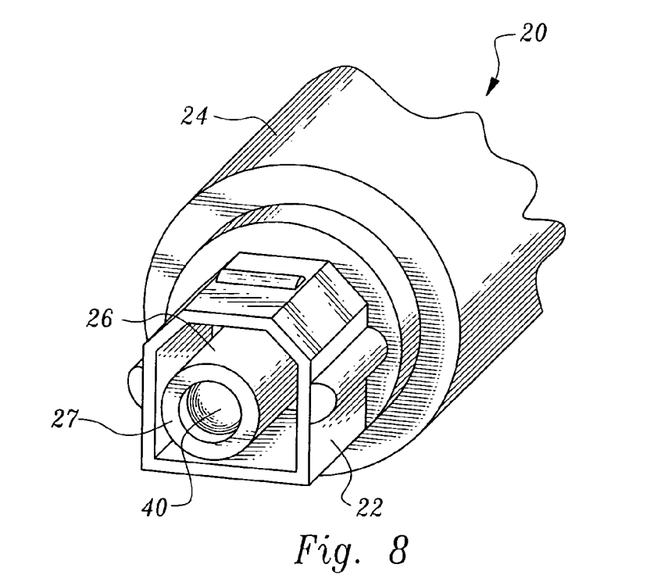
FIG. 8 is a detail of that which is shown in FIG. 7, particularly showing details of the tip of the connector and the front of the ball lens of the fiber terminating within the connector.

In essence, and with particular reference to FIGS. 1–3, basic details of the cable 10 are described. The cable 10 provides a run 12 of fiber optic light transmitting fiber 30 extending between a pair of fiber connectors 20 located at terminal ends of the cable 10. The connectors 20 are preferably identical to each other and configured to be compatible with TOSLINK connectors 80 (FIG. 10) within components 70 which are to be connected by the cable 10. The fiber 30 provides a light transmitting pathway between the two connectors in a fashion which allows an optical signal to be transmitted with sufficient transmission quality and efficiency, as the signal is transmitted from the first component 70 and received at the second component 70, that degradation of the signal is substantially avoided.

Where the fiber 30 terminates within each of the connectors 20, a ball lens 40 is preferably provided to enhance an amount of light which is received into the fiber 30, and hence a signal intensity passing through the fiber 30. The ball lens 40 at the distant end of the cable 10 discharges the light transmitted through the fiber 30 upon a light detector 60 (FIG. 9) within the receiving component 70, so that the ball lens 40 assists in maximizing the magnitude and quality of the optical signal transmitted through the fiber 30 of the cable 10.

More specifically, and with particular reference to FIGS. 1–3, particular details of the cable 10 and included fiber connectors 20 and fiber 30 are described. The cable 10 is an elongate construct made up of separate elements particularly configured to transmit an optical signal between terminal ends of the fiber 30 within the cable 10. The cable 10 includes a run 12 extending between the first and second fiber connectors 20 adjacent terminal ends of the fiber 30 within the cable 10. The run 12 of cable 10 is preferably surrounded by a cover 14 which also extends between the first and second fiber connectors 20. This cover 14 preferably is provided to protect the run 12 of cable 10 so that the fiber 30 therein avoids scratching or other damage. The cover 14 is preferably of a resilient material, such as a thin rubber sleeve surrounding the fiber 30.

Figure 9:
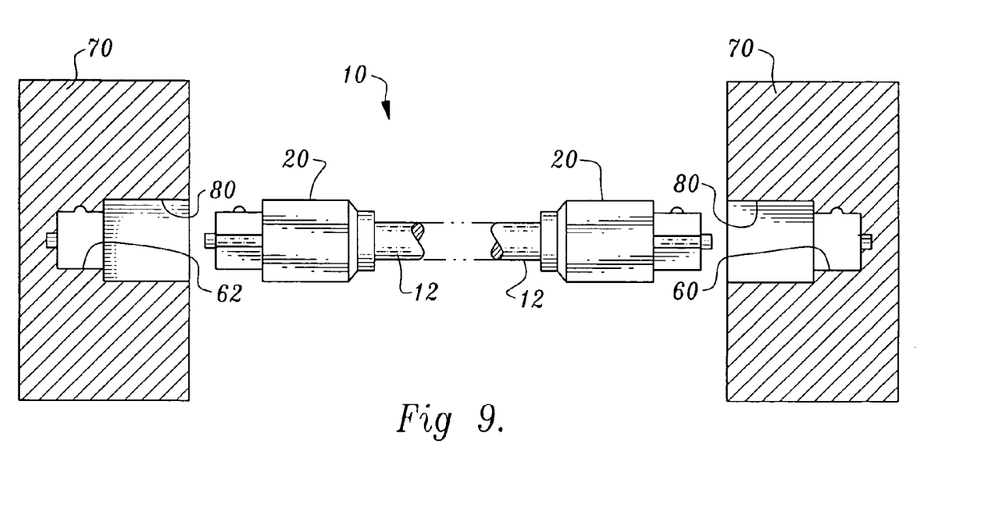
FIG. 9 is a schematic showing how the cable of this invention is used to join two components together so that the cable can transmit an optical signal between the two components.
Figure 10:
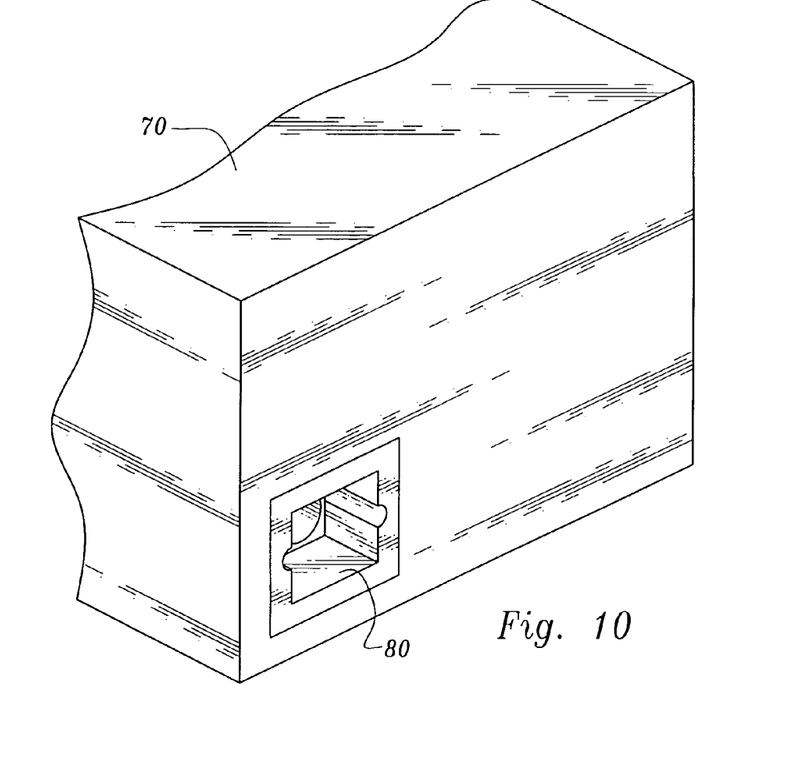
FIG. 10 is a perspective view of a portion of one of the components revealing generally the configuration of a component connector into which one of the fiber connectors at one of the terminal ends of the cable can be connected.

The fiber connectors 20 are preferably identical to each other and configured generally as male TOSLINK connectors, such that they can be connected to components, such as signal processing components 70 (FIG. 9) which are fitted with female TOSLINK connectors 80 (FIGS. 9 and 10). Each connector 20 preferably includes a shroud 22 which is faceted with facets which match those of a standard male TOSLINK connector so that the fiber connectors 20 can be received within female TOSLINK ports 80 (FIGS. 9 and 10) on TOSLINK compatible components 70, such as signal processing components and be held securely therein. A grip 24 preferably surrounds portions of each connector 20 between the run 12 and the shroud 22. The grip 24 provides a region which can be easily grasped by a hand of a user to insert and remove each connector 20 from an adjacent component 70.

A sheath 26 is preferably substantially concentrically located within the shroud 22 and extending linearly away from other portions of the connector 20 surrounding a centerline of the connector 20. The sheath 26 is preferably cylindrical in form extending to a tip 27 defining a portion of each connector 20 most distant from the run 12 of the cable 10, and most distant from the opposite fiber connector 20 at the opposite terminal end of the cable 10. An interior surface 28 of the sheath 26 is preferably cylindrical and aligned with a central axis of each connector 20.

The fiber 30 preferably exhibits a substantially constant cross-sectional diameter as it extends in an elongate fashion between the terminal end within each of the connectors 20. Particular geometric and chemical characteristics of the fiber 30 are described in detail below. The fiber 30 acts as a light transmitting conduit extending between the terminal ends of the cable 10. The fiber 30 is coated or otherwise surrounded with cladding 32 which is particularly configured to cause a light passing through the fiber 30 to be reflected and remain substantially entirely within the fiber 30. The fiber 30 is also particularly configured so that it exhibits sufficient flexibility to allow the run 12 of the cable 10 to be flexed and allow the cable 10 to be routed where desired. The cover 14 of the cable 10 can be provided with a stiffness sufficient to discourage or prevent bending of the fiber 30 beyond a point at which the fiber 30 would either undergo loss of the light signal passing there through or experience damage to the fiber 30, such as fracture, cracking, or other deformation of the fiber 30.

Each of the connectors 20 are preferably attached to the fiber 30, and the cover 14 of the cable 10 in a fashion which minimizes stresses upon the fiber 30 and maintains the orientation of the fiber 30 relative to the connectors 20. In this manner, the various different mechanical stresses applied to the cable 10 do not damage the fiber 30 or result in any degradation of light transmitting performance of the fiber 30 within the cable 10.

With continuing reference to FIGS. 1–3, particular details of a ball lens 40 adjacent each terminal end of the fiber 30 are described. While the fiber 30 could maintain a constant cross-sectional diameter and circular shape between terminal ends of the fiber 30, the fiber 30 most preferably includes diameter enhancement adjacent each of the two terminal ends of the fiber 30. This diameter enhancement can involve tapering of the fiber from an original lesser diameter to a maximum diameter adjacent terminal ends of the fiber, or can exhibit some other shape.

Most preferably, the shape of the fiber 30 at each terminal end thereof is in the form of a ball lens 40. Particularly, each ball lens 40 begins with a neck 42 (FIG. 2) adjacent the portion of the fiber 30 within each connector 20 adjacent where the ball lens 40 is located. This neck 42 has a similar diameter as that of the fiber 30 adjacent the ball lens 40. At the neck 42, the diameter of the fiber 40 first begins to increase as the fiber 30 extends further along a central axis of the fiber 30. This increasing diameter portion of the fiber 30 beyond the neck 42 is referred to as a tapering region on the ball lens 40.

The taper 44 is preferably in the form of a concave taper, so that a rate at which the fiber 30 increases in diameter is not constant moving along a central axis of the fiber 30, but rather accelerates initially moving along a centerline of the fiber 30, causing the portions of the fiber 30 within the taper 44 to have a concave appearance when viewed in full section, such as is shown in FIGS. 1 and 2. When surfaces of the fiber 30 at the taper 44 are beginning to approach the interior surface 28 of the sheath 26 of each of the connectors 20, the rate at which the fiber 30 continues to taper to a greater diameter begins to decrease.

At an inflection point 46, the tapering of the fiber 30 transitions from being a concave taper to being a convex taper. In the region where a convex taper is exhibited by the fiber 30, the fiber 30 is continuing to increase in diameter, but a rate of increase in diameter for the fiber 30 is decreasing as the fiber extends along a central axis.

The fiber 30 continues to have a rate of increase in its diameter decrease until the fiber 30 reaches a point of maximum diameter. When the fiber 30 exhibits its maximum diameter, the fiber 30 preferably has a diameter which matches that of the interior surface 28 of the sheath 26 within each connector 20. This maximum point 48 on the balls lens 40 defines a point where a diameter of the fiber 30 is at its maximum and at which the fiber 30 diameter stops increasing, but rather transitions into decreasing of the diameter of the fiber 30.

As the fiber 30 continues to extend away from the maximum 48, the fiber 30 preferably exhibits a forward curve 50 which is preferably substantially circular between upper and lower maximum points 48 of the fiber 30, when the fiber 30 is viewed in full section as shown in FIGS. 1 and 2. This forward curve 50 includes a front 52 of the fiber 30 which defines a maximum extent to which the fiber 30 extends along a central axis of the fiber 30.

The front 52 is preferably close to the tip 27 of each connector 20. Particularly, the front 52 of the ball lens 40 is preferably within 0.05 inches of the tip 27, and most preferably within 0.02 inches of the tip 27. While the front 52 is shown stopping short of the tip 27, the front 52 could conceivably extend beyond the tip 27 by this slight amount, and is believed to still be capable of functioning properly within an overall TOSLINK system.

The ball lens 40 has the effect of increasing a signal intensity of light which is allowed to enter into and be transmitted along the fiber 30 of the cable 10. Particularly, at a signal generating component, such as a DVD player, CD player or the like, an LED or other light source is provided coupled to an electrical to optical signal converter. The LED acts as the output of the electrical to optical signal converter, producing an optical signal to be entered into the fiber. Because the optical signal will degrade in the fiber as the signal travels through the fiber 30, it is desirable that the optical signal begin with as much signal intensity as possible, so that any degradation in the signal will still result in sufficient signal at the opposite end of the cable 10 to produce quality output from the cable 10.

The ball lens 40 increases a signal intensity of the optical signal in the following fashion. Because most of the forward curve 50 of the ball lens 40 is facing the LED or other light source, this light emitted from the LED is mostly transmitted through the surface of the forward curve 50 of the ball lens 40 and into an interior of the fiber 30. Only portions of the optical signal coming from the LED which strike the forward curve 50 of the ball lens 40 very close to the maximum points 48 of the ball lens 40 experience reflection.

Once the light from the LED passes through the surface of the front curve 50, the associated refraction tends to bend the light toward a central axis of the fiber 30, such that further intersection of the light with interior surfaces within the fiber 30 are internally reflected by the cladding 32 and cause the light to be transmitted along the fiber 30. Hence, more light from the LED ends up being transmitted along the fiber 30 with the presence of the ball lens 40 then would be transmitted into the fiber 30 if the fiber 30 maintained a constant diameter up to each terminal end.

When the signal reaches an output terminal end of the fiber 30, most of the optical signal transmitted through the fiber 30 is sufficiently parallel to a central axis of the fiber 30 that it strikes the forward curve 50 of the ball lens 40 at a relatively steep angle of incidence so that it is transmitted out of the ball lens 40 and against a detector. The detector can be a charged coupled device or other optical detector within a component 70, such as an amplifier including a optical to electrical converter of which the charged coupled device or other optical sensor is a part. Even if a small amount of the light is reflected or refracted in a way that it avoids the detector within the signal receiving component, such loss is minimal compared to the advantage in signal intensity provided by the ball lens 40 at the receiving end of the cable 10.

Signal intensity is further maintained by the cable 10 by selecting a geometry of the fiber 30 and chemical composition of the fiber 30 as follows. While prior art TOSLINK connector fiber has been formed of plastic material, the fiber 30 of this invention is preferably fused silica glass fiber. Such glass fiber has a particularly low signal loss character, with typical such fused silica glass fiber exhibiting a loss of less than eight decibels per kilometer. Most preferably, fiber is utilized which exhibits a loss of less than ten decibels per kilometer. In this way, only a small amount of signal is lost along a length of the fiber. This facilitates cable 30 having a run 12 of significant length without appreciable signal degradation. Additionally, the cladding 32 in the fiber 30 is preferably plastic cladding 32. For instance, plastic material such as polyethylene, or other long chain polymeric hydrocarbon materials having desirable refractive and reflective characteristics in many variant forms, and are preferably utilized.

To maximize flexibility of the cable 10, the fiber 30 is preferably 400 micrometers or less in diameter along the run 12 of the cable 10. The ball lenses 40 preferably have a diameter at the maximum points 48 of 1,000 micrometers. Preferably, the interior surface 28 of the sheath 26 also has the diameter of 1,000 micrometers with the maximum points of the ball lens in contact with the interior surface 28 of the sheath 26 so that ends of the fiber 30 at the ball lenses 40 are held in precise position by engaging the interior surface 28 of the sheath 26 within each of the connectors 20.

The cladding 32 on the exterior of the fiber 30 is preferably between 10 and 100 micrometers in thickness, with a 50 micrometer thickness being most preferable, so that the fiber 30 with included cladding 32 has a diameter of 500 micrometers along the run 12 of the cable 10. The cladding 32 preferably stops just short of portions of the fiber 30 adjacent the ball lens 40, at least at the maximum point 48 of the ball lens 40, so that internal reflection is facilitated by the cladding 32 up to the maximum point 48 on the ball lens 40.

FIGS. 9 and 10 illustrate further how the cable 10 of this invention is utilized to join separate components 70 together to transmit an optical signal between the components 70. Initially, a signal which is typically in electrical format is routed through an electrical to optical signal converter to generate an optical signal corresponding with the electrical signal. This electrical to optical signal converter typically includes an LED or other light emitter 62 which is driven by the electrical signal and emits light within one of the components 70.

The LED or other light emitter 62 is located adjacent a component connector 80 which is configured with a geometry and size which allows one of the fiber connectors 20 to be coupled thereto. With the connector 20 thus connected within the component connector 80, the optical signal emitted by the LED or other light emitter 62 passes into the fiber 30 within the cable 10 and is routed along the run 12 to the second fiber connector 20 at the distant end of the cable 10. The second connector 20 is preferably coupled to a receiving component 70 through a component connector 80. An optical signal receiver 60, such as a charged coupled device or other optical signal detector, is located adjacent the component connector 80 within the receiving component 70 so that the detector receives the light signal emitted from the second connector of the cable 10. This light detector is preferably coupled to an appropriate optical to electrical signal converter so that an electrical signal is produced at the receiving component 70 for further beneficial use.

In at least one embodiment, the signal generating component is in the form of a DVD player and the signal receiving component is in the form of an audio receiver. Many DVDs include a video track as well as multiple sound channels to reproduce a high quality sound when played through multiple speakers at the receiving location. The multiple separate audio signals for each of the speakers are originally included within the electrical signal produced by the DVD player or other signal generating component. These signals are read off of the DVD and are transmitted to the electrical to optical signal converter within the signal generating component 70. The optical signal is thus generated including each of the separate audio signals for each of the speakers, and optionally other signals, such as the video signal. Each of these signals can pass along the common fiber 30 within the cable 10 simultaneously to the signal receiving component 70. The signal receiving component 70 can then receive each of the separate signals and convert them to the appropriate channels within the receiving component to drive separate speakers and produce the desired sound quality at the receiving component location.

In another illustrative embodiment, the signal generating component can be in the form of an electronic component within an automobile. Some automobiles, such as those of the BMW corporation, have signals carried between signal generating components and signal receiving components by way of fiber optic cable. With this invention, the ball lens 40 and other features of the cable 10 beneficially enhance the quality of the signal received. The connector 80 specifics can be modified in alternative embodiments to accommodate easy attachment to other components as well.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. An optical to electrical signal transmission system, comprising in combination:

an elongate run of light transmitting fiber having at least one terminal end;

a first fiber connector attached to said fiber adjacent said at least one terminal end;

a first component connector adapted to be coupled to said first fiber connector;

an optical to electrical signal converter in fixed position relative to said first component connector and adapted to receive an optical signal from said at least one terminal end of said fiber when said first fiber connector is attached to said first component connector;

a ball lens at said at least one terminal end of said fiber, said ball lens having a greater width then a width of said fiber;

wherein said first fiber connector includes a shroud of cylindrical form located abutting said ball lens, said shroud oriented substantially coaxial with said ball lens;

wherein said shroud has an interior surface with a width substantially equal to a maximum width of said ball lens;

wherein said shroud extends to a tip, said ball lens having a front surface most distant from said elongate run of fiber, said front surface of said ball lens located short of said tip of said shroud and within 0.05 inches of said tip of said shroud along said central axis;

said shroud extending at said tip further along said central axis and away from said elongate run of fiber than any other portions of said first fiber connector, said shroud having an inner cylindrical surface which has a diameter matching said width of said ball lens, said inner cylindrical surface extending to said tip with said inner cylindrical surface having a common diameter at said tip as at said location abutting said ball lens; and wherein said ball lens is made of a common material with said fiber, and with said ball lens formed continuously with said fiber.

2. The signal transmission system of claim 1 wherein said front of said ball lens is less than 0.02 inches from said tip of said shroud along said central axis.

3. The signal transmission system of claim 1 wherein said ball lens exhibits a concave taper at both upper and lower sides of said ball lens when viewed in full section in a plane bisecting said ball lens and passing through a central axis of said ball lens and said fiber, with said concave tapers progressively increasing a diameter of said ball lens as said ball lens extends from a neck of said ball lens to a pair of inflection points on said ball lens.

4. The signal transmission system of claim 3 wherein said ball lens includes a substantially circular forward curve extending from between said inflection points and including a front of said ball lens halfway between said inflection points, said front defining a portion of said ball lens most distant from said neck and said elongate run of fiber.

5. The signal transmission system of claim 4 wherein said ball lens has a maximum diameter of approximately 1,000 micrometers.

6. The signal transmission system of claim 5 wherein said fiber has a diameter of less than 500 micrometers.

7. The signal transmission system of claim 6 wherein said fiber has a diameter of approximately 400 micrometers.

8. The signal transmission system of claim 1 wherein said ball lens has a maximum diameter portion which is at least twice a diameter of said fiber.

9. The signal transmission system of claim 1 wherein said fiber is formed of silica.

10. The signal transmission system of claim 9 wherein said fiber is formed of fused silica glass exhibiting less than ten decibels of signal intensity loss per kilometer.

11. The signal transmission system of claim 9 wherein said fiber includes cladding on a surface thereof, said cladding formed of a plastic material.

12. The signal transmission system of claim 11 wherein said plastic cladding is polyethylene.

13. The signal transmission system of claim 12 wherein said silica is fused silica glass.

14. The signal transmission system of claim 13 wherein said fiber is less than 500 micrometers in diameter with said ball lens at said at least one terminal end having a diameter of at least 1,000 micrometers.

15. The signal transmission system of claim 1 wherein said elongate run of light transmitting fiber includes a second terminal end opposite said at least one terminal end, said second terminal end including a second fiber connector attached to said fiber and adapted to be coupled to an LED input adjacent a second component connector, said LED coupled to an electrical to optical signal converter, such that said LED is adapted to deliver a signal into said elongate run of light transmitting fiber for transmission of said signal to said at least one terminal end.

16. The signal transmission system of claim 15 wherein said second terminal end is substantially identical to said at least one terminal end, such that said elongate run of light transmitting fiber is reversible.

17. An optical signal transmission fiber, comprising in combination:
an elongate run of glass fiber;
a pair of terminal ends located at opposite ends of said elongate run of glass fiber;
at least two fiber connectors, each fiber connector located at one of said terminal ends of said elongate run of glass fiber, said fiber connectors adapted to removably connect said ends of said fiber to adjacent components;
plastic cladding coating a majority of a surface of said fiber;
wherein each of said terminal ends includes a ball lens thereon, said ball lens having a greater width than a width of said fiber;
wherein said ball lens has a diameter at least twice as great as a diameter of said fiber;
wherein said ball lens is formed integrally with said fiber and from a common material with said fiber, said ball lens exhibiting a concave taper at both upper and lower sides of said ball lens when viewed in section in a plane bisecting said ball lens and passing through a central axis of said ball lens, said concave taper extending from a neck where said ball lens has a diameter similar to said fiber and where said ball lens joins said fiber to a pair of inflection points, and wherein said ball lens continues in substantially circular form between said inflection points with a front of said ball lens defining a forward most portion of said ball lens located midway between said inflection points;
wherein each said fiber connector includes a shroud of cylindrical form located abutting said ball lens, said shroud oriented substantially coaxial with said ball lens;
wherein said shroud has an interior surface with a width substantially equal to a maximum width of said ball lens;
wherein said shroud extends to a tip, said ball lens having a front surface most distant from said elongate run of glass fiber, said front surface of said ball lens located short of said tip of said shroud and within 0.05 inches of said tip of said shroud along said central axis;
said shroud extending at said tip further along said central axis and away from said elongate run of glass fiber than any other portions of each said fiber connector, said shroud having an inner cylindrical surface which has a diameter matching said width of said ball lens, said inner cylindrical surface extending to said tip with said inner cylindrical surface having a common diameter at said tip as at said location abutting said ball lens; and
wherein said ball lens is made of a common material with said fiber, and with said ball lens formed continuously with said fiber.

18. The fiber of claim 17 wherein said glass includes silica glass.

19. The fiber of claim 18 wherein said silica glass is fused silica glass.

20. The fiber of claim 19 wherein said fiber exhibits less than ten decibels per kilometer of signal loss.

21. The fiber of claim 17 wherein said plastic cladding includes an at least partially opaque polymeric hydrocarbon plastic material.

22. The fiber of claim 21 wherein said plastic cladding includes polyethylene.

23. The fiber of claim 17 wherein said plastic cladding is between 10 micrometers and 100 micrometers thick.

24. The fiber of claim 23 wherein said plastic cladding is substantially 50 micrometers inches thick.

25. An electrical to optical signal transmission system, comprising in combination:
   an elongate run of light transmitting fiber having at least one terminal end;
   a first fiber connector attached to said fiber adjacent said at least one terminal end;
   a first component connector adapted to be coupled to said first fiber connector;
   an electrical to optical signal converter in fixed position relative to said first component connector and adapted to transmit an optical signal from a light emitter to said fiber when said first component connector is attached to said first fiber connector, and adapted to drive said light emitter with an electrical input driving said light emitter;
   a ball lens at said at least one terminal end of said fiber, said ball lens having a greater width then a width of said fiber;
   wherein said first fiber connector includes a shroud of cylindrical form located abutting said ball lens, said shroud oriented substantially coaxial with said ball lens;
   wherein said shroud has an interior surface with a width substantially equal to a maximum width of said ball lens;
   wherein said shroud extends to a tip, said ball lens having a front surface most distant from said elongate run of fiber, said front surface of said ball lens located short of said tip of said shroud and within 0.05 inches of said tip of said shroud along said central axis;
   said shroud extending at said tip further along said central axis and away from said elongate run of fiber than any other portions of said first fiber connector, said shroud having an inner cylindrical surface which has a diameter matching said width of said ball lens, said inner cylindrical surface extending to said tip with said inner cylindrical surface having a common diameter at said tip as at said location abutting said ball lens; and
   wherein said ball lens is made of a common material with said fiber, and with said ball lens formed continuously with said fiber.

26. The system of claim 25 wherein said light emitter of said electrical to optical signal converter includes a light emitting diode powered by an electric circuit adapted to deliver an electric signal to said LED for conversion to an optical signal through said LED.

27. The system of claim 26 wherein said first component connector and said electrical to optical signal converter are in the form of part of a TOSLINK signal transmission system.

28. The system of claim 25 wherein said fiber includes plastic cladding coating a majority of a surface of said fiber, and wherein said fiber is formed of fused silica glass.

29. The system of claim 25 wherein said elongate run of light transmitting fiber includes a second terminal end opposite said at least one terminal end, said second terminal end identical with said at least one terminal end, such that said fiber is reversible.

30. An optical signal transmission fiber, comprising in combination:
   an elongate run of light transmitting fiber extending between a first terminal end and a second terminal end;
   two fiber connectors, each said fiber connector attached to said fiber adjacent one of said terminal ends;
   two ball lenses, each said ball lens located at one of said terminal ends of said fiber, each said ball lens having a greater width than a width of said fiber;
   wherein said first connectors each include a shroud of cylindrical form located abutting said ball lens, said shroud oriented substantially coaxial with said ball lens;
   wherein said shroud has an interior surface with a width substantially equal to a maximum width of said ball lens;
   wherein said shroud extends to a tip, said ball lens having a front surface most distant from said elongate run of fiber, said front surface of said ball lens located short of said tip of said shroud and within 0.05 inches of said tip of said shroud along said central axis:
   said shroud extending at said tip further along said central axis and away from said elongate run of fiber than any other portions of said fiber connectors, each said shroud having an inner cylindrical surface which has a diameter matching said width of said ball lens, said inner cylindrical surface extending to said tip with said inner cylindrical surface having a common diameter at said tip as at said location abutting said ball lens; and
   wherein each said ball lens is made of a common material with said fiber, and with said ball lenses formed continuously with said fiber.

31. The fiber of claim 30 wherein said fiber includes plastic cladding coating a majority of a surface of said fiber and wherein said fiber is formed of glass.

32. The fiber of claim 31 wherein said glass has a signal intensity loss of less than ten decibels per kilometer.

33. The fiber of claim 32 wherein said fiber has a diameter of less than 500 micrometers, and wherein a diameter of said ball lens is greater than 500 micrometers.

34. The fiber of claim 33 wherein said ball lens has a maximum diameter of at least 1,000 micrometers.

* * * * *